United States Patent
Brown et al.

(10) Patent No.: US 6,172,457 B1
(45) Date of Patent: Jan. 9, 2001

(54) THERMALLY COMPATIBLE CERAMIC COLLARS FOR FLAT PANEL DISPLAYS

(75) Inventors: Christina M Brown, San Mateo; Raymond G Capek, San Carlos, both of CA (US)

(73) Assignee: Telegen Corporation, San Mateo, CA (US)

( * ) Notice: Under 35 U.S.C. 154(b), the term of this patent shall be extended for 0 days.

(21) Appl. No.: 08/824,144

(22) Filed: Mar. 25, 1997

(51) Int. Cl.[7] .................................. H01J 19/46; H01J 1/92
(52) U.S. Cl. ........................... 313/496; 313/493; 313/422
(58) Field of Search ..................................... 313/495, 496, 313/497, 422, 582, 493; 445/25

(56) References Cited

U.S. PATENT DOCUMENTS

| | | | |
|---|---|---|---|
| 4,745,330 | * | 5/1988 | Capek et al. ........................... 313/407 |
| 5,086,251 | * | 2/1992 | Capek et al. ........................... 313/407 |
| 5,369,062 | * | 11/1994 | Chiang et al. ........................... 501/63 |

* cited by examiner

Primary Examiner—Michael H. Day
(74) Attorney, Agent, or Firm—Victoria S. Kolakowski; Leigh Ann Weiland

(57) ABSTRACT

A Flat Panel Display apparatus has a spacing component composed of a ceramic material which creates an accurately controllable and variable compressive strain on prescribed critical areas of the inner surface of the display panel and backplane which strengthens the assembly and permits the use of thiner and lighter materials.

4 Claims, 3 Drawing Sheets

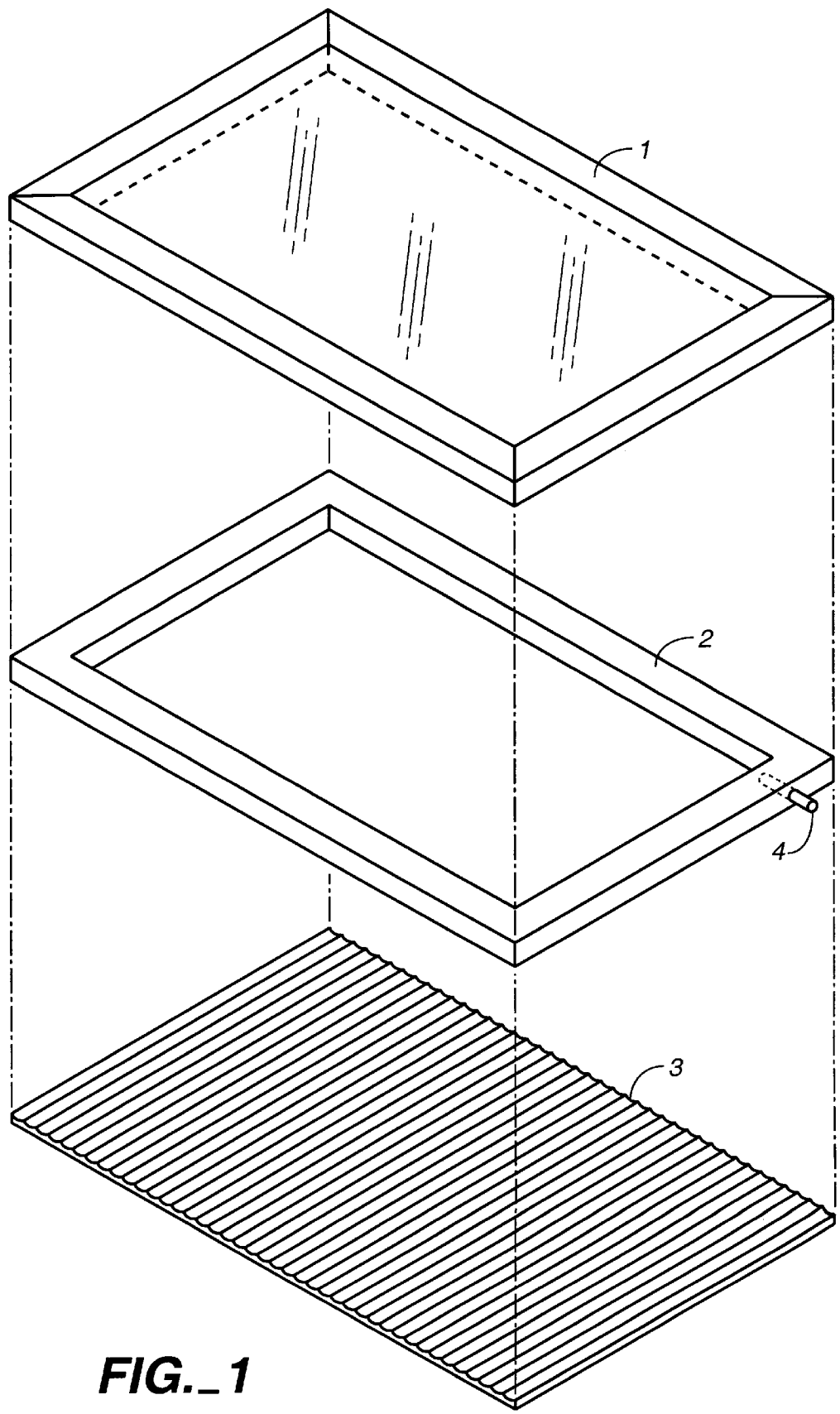
FIG._1

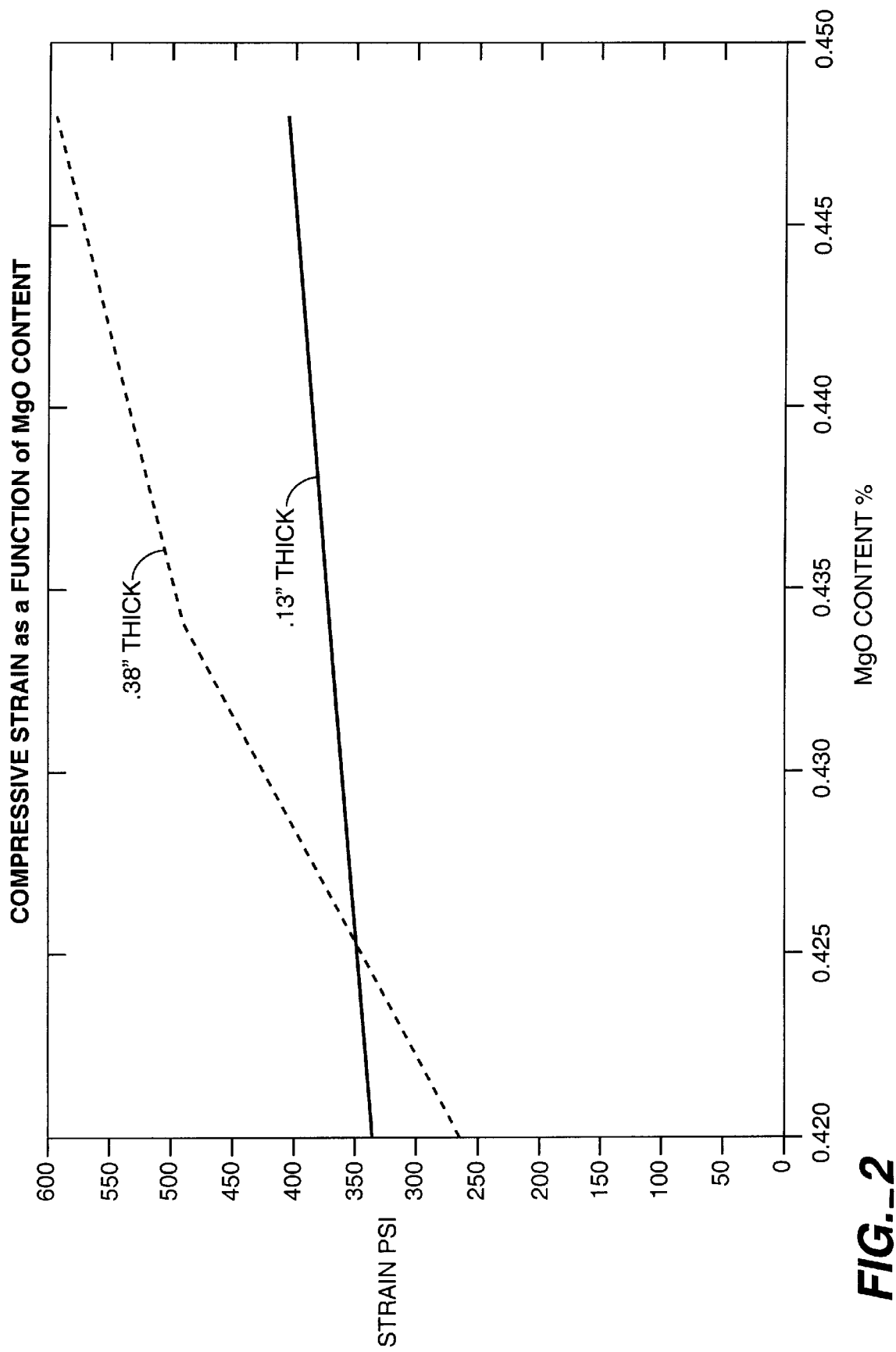
FIG._2

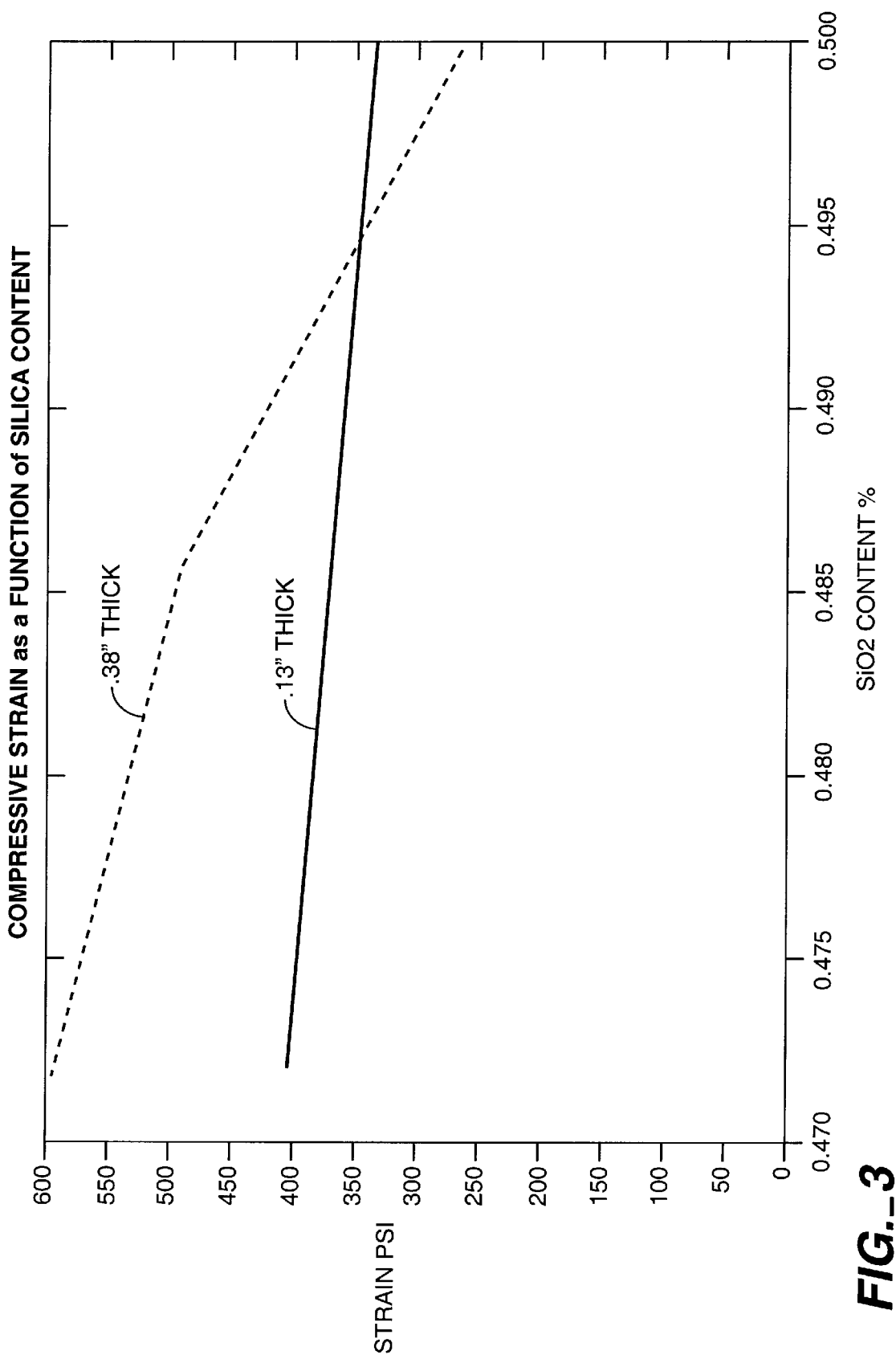
FIG._3

THERMALLY COMPATIBLE CERAMIC COLLARS FOR FLAT PANEL DISPLAYS

CROSS-REFERENCE TO RELATED APPLICATIONS

This application is related to but in no way dependent upon application Ser. No. 08/576,641 filed Dec. 21, 1995 now U.S. Pat. No. 5,949,395, and Ser. No. 08/735,825 filed Dec. 2, 1996, both of common ownership herewith.

BACKGROUND—FIELD OF THE INVENTION

The present invention relates generally to ceramic compositions and more specifically to ceramic components used in flat panel display devices, wherein high thermal resistance, high compressive and bending strength, and a coefficient of thermal expansion similar to that of soda lime silica glass are desirable.

BACKGROUND—DESCRIPTION OF PRIOR ART

Construction of flat panel display devices presents unique challenges to selection of materials. The display devices are often comprised of a proportionally large frontal area of soda lime silica glass (SLG) patterned with stripes of Indium Tin Oxide (ITO) and phosphors, (also referred herein as the Display Panel or display glass), physically bonded to a similar areas of metal, ITO coated glass, or ceramic (collectively referred herein as the Backplane or backpanel) by means of a series of SLG spacers. The envelope formed by the combination of the Display Panel, the SLG spacers, and the Backplane contains the interior components for electron generation (cathode) and electron targeting systems (grids or gates). To operate, the entire assembly must be sealed in such manner to maintain a high vacuum within the envelope.

Typically, the assembly components are bonded by means of heat sealing; that is devitrifiable solder glass or vitreous solder glass (collectively referred herein as "frit") is applied to the edge surfaces (interface) where the Display Panel and Backplane come into contact with the glass spacers. The device is placed in a sealing oven which raises the temperature of the assembly to or above the temperature at which frit melts. At that elevated temperature, the glass spacers become bonded to the Display Panel and Backplane. As the frit crystallizes, any differential between the net CTC (coefficient of thermal contraction) of the glass spacers and either the Display Panel or the Backplane will create strains in the assembly at the interface. As SLG is strong in compression but weak in tension, there is always the concern that any thermal coefficient mismatch between the glass spacers and either the Display Panel or the Backplane will create a fracture surface or failure at the interface area. Due to the extremely low fracture toughness of the glassy material in this region, initiation and propagation of cracks and subsequent inability of the assembly to hold a sufficiently high vacumn effectively prevents operation of the interior components.

Additionally, due to mismatches between the interior cathode and grid structures both of which extend their electrical contacts through the glass spacers and rely upon these same spacers for support by means of frit sealing, fractures occur in the sub-structures glass surface when the assembly is subjected to thermal changes. Thermal shocking of the interior cathode and grid support structures can occur when the assembly is heated during evacuation, and again during operation of the display.

Thermal shocking has been found to produce microfissures in the frit at the point where the interior cathode and grid structures are sealed to the glass spacers. Such microfissures in the frit material result in contamination of the vacuum environment within the assembly after pump-down and seal-off due to outgassing through the microfractured frit.

Ceramic materials have long been used in connection with shadow mask supporting structures in Cathode Ray Tubes (CRT) where similar problems involving the CTC of the support structure and the glass face plate exist. In accordance with the teachings of this invention, as described in detail hereafter, the SLG spacers are replaced by a ceramic material of a composition between fosterite ($2MgO \cdot SiO_2$) and steatites ($MgO \cdot SiO_2$) extruded into the shape of a collar. By varying the amount of $SiO_2$ and MgO to control the CTC in the ceramic material, the collar places the Display Panel and Backplane in compression after sealing while withstanding tensile forces. Ceramic collars of the composition hereinafter described are especially useful in flat panel display devices due to their relatively low weight, high tensile strength, and resistance to damage from vibration, impact and thermal cycling.

In U.S. Pat. No. 4,745,330—Capek et al teaches the use of a three layer ceramic system in a CRT mask supporting structure to vary the CTC in steps of $2\times10^{-7}$ in./in./degree Celsius thus "stepping down" or buffering the tensile forces present at the interface during thermal cycling.

Using a similar ceramic compositions described in U.S. Pat. 5,086,251—Capek et al improved upon the '330 patent by showing, also in connection with a CRT mask supporting structure, that the use of a ceramic element having varying the amount of MgO content in a fosterite composition coupled with the use of a cement having a CTC intermediate between the faceplate and the mask supporting structure and a grooved holder to further reduced tensile forces.

In accordance with an aspect of this invention both $SiO_2$ and MgO are varied to control the CTC with the result of extremely precise strain control in the seal provided at the interface area.

Prior Art

U.S. Pat. No. 4,745,330—Capek et al; U.S. Pat. No. 5,086,251—Capek et al; U.S. Pat. No. 5,369,062 —Chiang et al.

Objects of the Invention

It is a general object of the invention to provide a flat panel display assembly having an improved spacing component between the Display Panel and the Backplane.

It is another object of the invention to provide a flat panel display in which the assembly of the Display Panel, spacing component, and the Backplane are so constructed as to overcome the aforementioned problem of glass failures due to cracks propagating from the interface between the spacing component and the Display Panel and/or spacing component and the Backplane.

It is another object of the invention to provide a flat panel display having such an improved spacing component that yield losses due to outgassing and spallation at the places where the supported internal structures are bonded to the spacing component are reduced.

It is another object of the invention to provide a flat panel display having an improved assembly that can readily be adjusted to accommodate Display Panel glass of differing compositions and differing flat panel display designs and/or production objectives such as maximized throughput, maximized yield, varying display sizes, etc.

It is another object of the invention to provide a flat panel display having an improved assembly that permits the use of higher thermal gradients during envelope evacuation, with resulting greater yields and/or throughput and consequent reduced manufacturing costs.

It is another object of the invention to provide a flat panel display by which the desired tensile strain at the interface of the spacing component and the Display Panel and/or spacing component and the Backplane can be accurately controlled in a mass production environment.

It is another object of the invention to provide a flat panel display by which the materials used in the Display Panel and the Backplane can be thinner and lighter in weight.

These and other objects and advantages will become more apparent after consideration of the ensuing description and the accompanying drawings.

SUMMARY OF INVENTION

The invention consists of a novel use of a ceramic composition as a spacing component for flat panel displays. By careful selection of the composition of the ceramic material, precise control over the stresses imposed upon the bonded components may be achieved. By selecting material which places the Display Panel and Backplane in compression, the sealed envelope so formed will withstand the stress of repeated heatings and pump-downs. Upon sealing a very high interior vacumn may be supported. The ability of ceramic material to be extruded in unique shapes with uniform strength permits the design of alternative styles of spacing components. which adds to the structural strength of the apparatus while permitting the use of thinner, lighter weight Display Panel.

BRIEF DESCRIPTION OF THE DRAWINGS

The features of the present invention which are believed to be novel are set forth with particularity in the appended claims. The invention, together with further objects and advantages thereof, may be best understood by reference to the following description taken in conjunction with the accompanying drawings (not to scale), in the two figures of which like reference numerals identify like elements, and in which:

FIG. 1 is a perspective view illustrating a typical flat panel display enclosure.

FIG. 2 is a plot of compressive strain as a function of MgO content.

FIG. 3 is a plot of compressive strain as a function of MgO content.

DETAILED DESCRIPTION AND PREFERRED EMBODIMENT

The present invention will be best understood after a brief review of the prior art. FIG. 1 illustrates a typical enclosure for a flat panel display system. For reasons of clarity, only those portions of the system having to do with the enclosure apparatus and the envelope created therein is shown in the drawing. The envelope is created by the combination of a display plate 1 bonded to a spacing component 2, which is bonded to a Backplane 3. The display plate consists of SLG with its inner surface coated with strips of Indium Tin Oxide and/or fine Invar overlaid with a wire grid. Upon these strips ZnO:Zn phosphors, are deposited for a monochrome display.

For a color display, the ITO strips are separated and three separate electrical circuits with $ZnS:Ag,Cl$ and $ZnS:Cu,Al,Au$ and $Y_2O_2 S:Eu$ phosphors are deposited. Electrical contact(s) is/are guided out of the display plate either by continuing the ITO strips to the outside of the display area or by electrical contact with a similar contact in the spacing component.

The backpanel 3 has the same geometric shape as the display panel and may be formed from SLG or Invar metal.

The spacing component 2 holds in its interior the electron generation and targeting means. It is bonded to the inner surfaces of the display plate and backpanel by means of frit such as Corning Asahi 7590. The entire apparatus is then fired at temperature of 450° C. to melt the frit and upon cooling seal the apparatus. An opening 4 in the side of the spacing component 2 permits pump-down of the interior of the envelope.

Considerable care must be taken in the selection of the SLG of the display panel, the backpanel (if SLG is used), the glass frit, and the material of the spacing component to ensure that the CTC for each component is within $\pm 3 \times 10^{-7}$ in./in./degree Celsius. Typically, the spacing component is formed from rods of SLG. However, experimental results using same SLG for both the display plate 1, the backpanel 3, and the spacing component 2 show microfisures in the frit after firing. These assemblies are prone to failure during evacuation or pump-down. Many of these assemblies have failed upon pump-down. Variations in the SLG when components are chosen from different batches definitely create a CTC mismatch and an undesireable strain condition. As an example the variation in CTC of a SLG from Schott Glasswerke is $90 \times 10^{-7}$ in./in./degree Celsius while that from Vitro Plano Corporation composition is typically $98 \times 10^{-7}$ in./in./degree Celsius. It may be noted that some improvement in yield may be obtained from the use of Invar in lieu of SLG as a Backplane, though microfisures in the frit continue to reduce yields.

It is well known to material scientists that glass under compression demonstrates significant strength over glass with neutral stress or glass in tension. Placing the SLG in compression in the application of a flat panel display apparatus would be an obvious answer. Implementation of stressing procedures to place the display panel and the Backplane in compression using SLG rods as a spacing component results in tension on the the SLG rods. Component failure is transfered from the display panel or the Backplane to the rods. Use of alternate material such as Invar or other metals results in further stress on the glass frit.

An unobvious improvement occurs when the material selected for the spacing component has controlled expansion properties that vary slightly from SLG during the cooling cycle. It is know that vitrified ceramic material can exhibit CTC over ranges similar to SLG, but precise control over the composition has been difficult. Given the variations in CTC of SLG, those skilled in the art have rejected the use of ceramics in flat panel display apparatus applications in favor of SLG components.

It is a feature of this invention that a novel formulation of a ceramic material used in the spacing components of a flat panel display apparatus permits precise adjustment of the CTC of the spacing component to hold the SLG components in compression of a range of 200 to 800 psi.

FIG. 2 is a plot of compressive strain of two exemplar SLG Display Panels, 0.38" and 0.13", as a function of MgO content of a hypothetical ceramic spacing component. FIG. 3 is a plot of compressive strain of the same two exemplar SLG Display Panels as a function of $SiO_2$. The relationship seen in both plots is substantially linear, providing an accurate and useful tool for selecting the composition of the ceramic material for the amount of SLG Display Panel compression required.

The preferred compositions of the ceramic materials, designated as "SL7 Oxide," "SL8 Oxide," and "SL9 Oxide" are shown contrasted with fosterite and steatite as used in the prior art.

Preferred Compositions of Ceramic Collars (percentage by weight)

| Components | Fosterite | SL7 Oxide | SL8 Oxide | SL9 Oxide | Steatite |
|---|---|---|---|---|---|
| $SiO_2$ | 39% | 47.2% | 48.6% | 50.0% | 60.2% |
| MgO | 53% | 44.8% | 43.4% | 42.0% | 31.8% |
| $BaCO_3$ | 5.0% | 5.0% | 5.0% | 5.0% | 5.0% |
| $Al_2O_3$ | 1.7% | 1.7% | 1.7% | 1.7% | 1.7% |
| $Fe_2O_3$ | 0.8% | 0.8% | 0.8% | 0.8% | 0.8% |
| CaO | 0.4% | 0.4% | 0.4% | 0.4% | 0.4% |
| Ball Clay | 0.1% | 0.1% | 0.1% | 0.1% | 0.1% |

As stated earlier, there is a deliberate CTC mismatch created by the ceramic collar, used as the spacing component, and the Display Panel. The mismatch causes the spacing component to hold the Display Panel in compression at the desired level of strain as created by the composition of the ceramic, the primary contituents being the proportions of MgO and $SiO_2$ as determined by FIG. 2 and FIG. 3 respectively.

Between the spacing component and the Display Panel and again between the spacing component and the Backplane devirtitfied solder glass is used to cement these components to the spacing component. Typically the CTC chosen for the formula of the devirtitfied solder glass is chosen intermediate between that of the spacing component and the component to be bonded.

While a particular embodiment of the invention has been shown and described, it will be readily apparent to those skilled in the art that changes and modifications may be made in the inventive means without departing from the invention in its broader aspects, and therefore, the aim of the appended claims is to cover all such changes and modifications as fall within the scope of the invention.

We claim:

1. A flat panel display apparatus comprising:
    a) a display panel on the front face of said display apparatus, said display panel having an inner surface with a target area for receiving a cathodoluminescent screen, said display panel being composed of a glass having a predetermined coefficient of thermal contraction; and
    b) a backplane on the rear of said display apparatus, said backplane having an inner surface reflective to electrons, said backplane being composed of a glass having a predetermined coefficient of thermal contraction; and
    c) a spacing component secured to the inner surfaces of said display panel and said backplane by devitrified solder glass, said spacing component forming a sealed envelope within said apparatus, said spacing component having a net coefficient of thermal contraction which is lower than said predetermined coefficients of thermal contraction of said display panel and said backplane such that after devitrification of said solder glass at an elevated temperature to affix said spacing component to said display panel and said backplane, and subsequent cool-down, said display panel and said backplane are placed under predetermined significant compression.

2. The flat panel display apparatus of claim 1, wherein the envelope formed is evacuated.

3. The flat panel display apparatus of claim 1, wherein the spacing component is composed of a ceramic, said ceramic comprises:
    between about 47% and 50% by weight of $SiO_2$;
    between about 42% and 45% by weight of MgO;
    about 5% by weight of $BaCO_3$;
    about 2% by weight of $Al_2O_3$;
    about 1% by weight of $Fe_2O_3$;
    about 0.5% by weight of CaO; and
    about 0.1% by weight of Ball Clay.

4. A flat-panel display apparatus comprising:
    a) a display panel on the front face of said display apparatus, said display panel having an inner surface with a target area for receiving a cathodoluminescent screen, said display panel being composed of a glass having a predetermined coefficient of thermal contraction;
    b) a backplane on the read of said display apparatus, said backplane having an inner surface reflective to electrons, said backplane being composed of Invar having a predetermined coefficient of thermal contraction; and
    c) a spacing component secured to the inner surfaces of said display panel and said backplane by devitrified solder glass, said spacing component forming a sealed envelope within said apparatus, said spacing component having a net coefficient of thermal contraction which is lower than said predetermined coefficients of thermal contraction of said display panel and said backplane such that after devitrification of said solder glass at an elevated temperature to affix said spacing component to said display panel and said backplane, and subsequent cooldown, said display panel and said backplane are placed under predetermined significant compression.

* * * * *